T. PARTRIDGE, Jr., J. CARR & C. GENTLE.
BALL BEARING.
APPLICATION FILED AUG. 16, 1909.

966,589.

Patented Aug. 9, 1910.

Witnesses.

Inventors
Thos. Partridge Jr.
John Carr
Charles Gentle
by E. J. Fetherstonhaugh
Atty.

UNITED STATES PATENT OFFICE.

THOMAS PARTRIDGE, JR., JOHN CARR, AND CHARLES GENTLE, OF HAMILTON, ONTARIO, CANADA, ASSIGNORS TO ROBERT TASKER STEELE, OF HAMILTON, CANADA.

BALL-BEARING.

966,589.     Specification of Letters Patent.     Patented Aug. 9, 1910.

Application filed August 16, 1909. Serial No. 513,168.

*To all whom it may concern:*

Be it known that we, THOMAS PARTRIDGE, Jr., JOHN CARR, and CHARLES GENTLE, subjects of the King of Great Britain, and residents of the city of Hamilton, county of Wentworth, Province of Ontario, in the Dominion of Canada, have invented certain new and useful Improvements in Ball-Bearings, of which the following is a specification.

The invention relates to improvements in ball bearings, as described in the following specification and illustrated in the accompanying drawings that form part of the same.

The invention consists essentially in the novel construction and arrangement of parts whereby the balls are held in permanent ball races in the outer bearing member by members inserted from each end of said outer member, said inner members being non-rotatively held on the shaft and each having permanent ball races registering with the ball races in said outer member.

The objects of the invention are, to provide a ball bearing of simple, strong and durable construction particularly adapted for use in trucks and vehicles, to overcome the difficulties met in the ordinary forms of ball bearings through the different bearing portions getting out of adjustment, and to devise a form of ball bearing which may be manufactured at very low cost.

Figure 1:
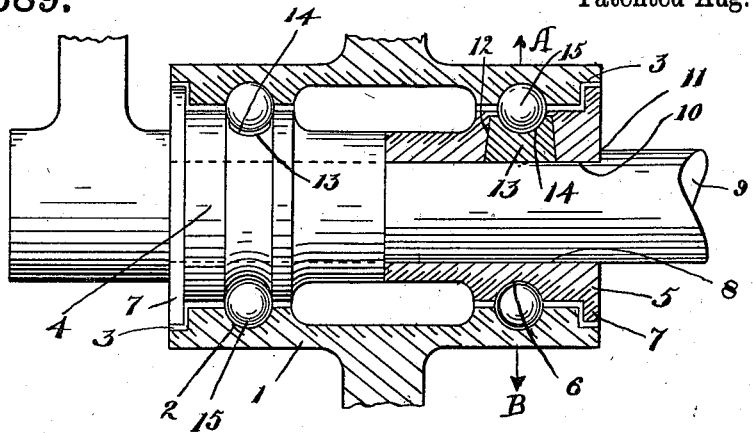
Figure 2:
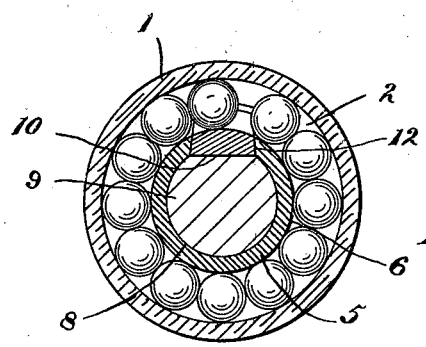
Figure 3:
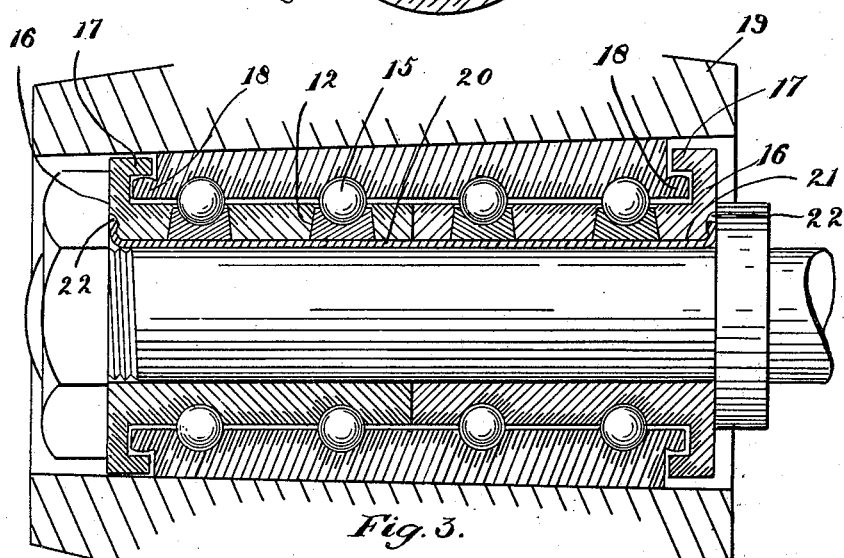

In the drawings, Figure 1 is a longitudinal sectional view of the preferable form of bearing for small trucks of various kinds. Fig. 2 is a cross section through the line A—B Fig. 1. Fig. 3 is a longitudinal sectional view showing the invention applied to a wheel hub for wagons or other vehicles.

Like numerals of reference indicate corresponding parts in each figure.

Referring to the drawings, 1 is the wheel hub or outer bearing member having the ball races 2 formed in the inner face thereof and the counter sunk recesses 3 at the ends.

4 and 5 are the inner bearing members having the ball races 6 in the outer periphery adapted to register with the ball races 2 in the member 1 and the flanges 7 at the outer ends adapted to fit into the recesses 3 in the ends of said outer member, said flanges forming dust caps to prevent the ingress of dust and dirt to the bearings.

8 are central orifices extending longitudinally through the inner members 4 and 5 and adapted to receive the end of the axle or shaft 9, said orifices having a flattened portion 10 corresponding with the flattened face of the said axle or shaft. The members 4 and 5 are thus non-rotatively secured on the said axle or shaft. The outer end of the member 5 abuts the shoulder 11 formed at the inner end of the flattened portion of the axle 9 and both members secured thereon by a suitable nut or by the axle supports.

12 are tapered openings formed in the members 4 and 5 preferably arranged to extend from the flattened portion 10 and tapering toward the ball races.

13 are tapered blocks fitting into the tapered openings 12 in the members 4 and 5 having their outer faces formed with a groove 14 to complete the ball races of said members.

15 are the balls retained between the ball races formed in the inner and outer bearing members.

In assembling the parts of this device the inner members are inserted into the outer member and the balls inserted through the tapered openings and when the ball races are filled, the tapered blocks 13 are placed in position closing the said openings and completing the ball races. The inner members are then slipped on to the axle or shaft and secured in place. The tapered blocks bear against the flattened portion of the axle and are preferably arranged to the upper side so that the balls merely travel loosely over the top thereof, the bearing weight being against the under side of said inner members. The blocks fit snugly into their orifices however so that the axle and inner members may form the rotating portion of the bearing if so desired, though for wagons or trucks it is preferable to hold the axle stationary.

The form shown in Fig. 3 is practically speaking the same as that shown in Figs. 1 and 2 except that the bearing is formed with more than two sets of ball races. The outer flanges 16 are formed with an inwardly projecting flange 17 extending over the beaded end 18 of the outer bearing member. The hub 19 projects outwardly beyond the outer bearing member. The balls are placed in position between the races in the same manner as in the former construction described and the whole secured in place upon the axle or shaft by a suitable nut or other means.

In the form of bearing as shown in Fig. 3, which is preferably used for wagon or car wheels, it is desirable that the tapered blocks for closing the ball races of the inner bearing members be held securely in the event of the wheel being taken off the axle and in order to accomplish this result, the metal clip 20 is inserted in the groove 21 extending from end to end of the said inner members across the base of the tapered openings 12 and the ends of said clip bent upwardly and inwardly into the recesses 22 in the outer ends of said inner bearing members.

The most important features of the present invention are the extremely simple and inexpensive construction. Both inner and outer bearing members are cast iron, no machining or grinding is necessary, the ball races being cast clean and free of lumps or ridges. The features of not having to grind the parts is very important, for, as is well known, a very hard skin forms on the outer face of iron castings and this surface forms an excellent bearing surface which will wear for a long time.

The simplicity and cheapness of construction of this bearing allows the use of ball bearings on small trucks and many forms of vehicles as it can be supplied at as low cost as the ordinary form of bearing. The value of such a bearing will therefore be readily apparent, as the saving of labor by reduction of friction by the use of ball bearings is well known.

What we claim as our invention is:—

1. In a ball bearing, an outer bearing member cylindrical in form having annular grooves formed in its surface, said member being cast and having a hardened skin continuing across the surface of the said ball races, an inner bearing member substantially cylindrical having annular grooves formed in its outer surface adapted to register with the grooves in said outer member, said inner member having a hard skin extending across the said grooves and said inner member also having tapered orifices extending radially outward to the periphery, and tapered blocks closing said orifices.

2. In a ball bearing, an outer bearing member having a plurality of annular grooves cast in the inner cylindrical wall thereof and forming ball races, a pair of inner bearing members having annular grooves formed in their peripheries and forming ball races adapted to register with the ball races in said outer member and individual orifices leading from the central openings to each ball race and also having flanged outer ends, blocks adapted to fit the openings leading to the ball races in said inner members, and a shaft inserted through the central openings in said inner members and fixedly secured thereto.

3. In a ball bearing, an outer bearing member having ball races in its inner wall, a pair of inner bearing members having ball races registering with the ball races in said outer member and a longitudinal central orifice therethrough, and tapered orifices leading from said central orifice to the ball races in the outer peripheries of said members, a shaft having a flattened portion corresponding with the flattened portion of the central orifice through said inner bearing members and adapted to slide thereinto, and tapered blocks fitting into the tapered orifices in said inner members and having grooved outer ends formed to complete the ball races of said inner bearing members.

4. In a ball bearing, an outer bearing member having ball races in its inner wall, a pair of inner bearing members having ball races registering with the ball races in said outer bearing member and a longitudinal orifice therethrough and a longitudinal recess extending from end to end thereof in their inner walls and a plurality of tapered orifices leading from said central orifice to the ball races in the outer peripheries of said inner bearing members, tapered blocks fitting into the tapered orifices in said inner bearing members and completing the ball races in said members, and a metal clip fitting within the longitudinal recesses in said inner members and having the outer ends bent outwardly into suitable recesses formed in the ends of said inner bearing members, said clip holding said blocks securely in place and said inner bearing members together.

Signed at the city of Hamilton, county of Wentworth, Province of Ontario, in the Dominion of Canada, this ninth day of August 1909.

THOS. PARTRIDGE, Jr.
JOHN CARR.
CHARLES GENTLE.

Witnesses:
H. NEWBURN,
FRANCIS VILA.